United States Patent [19]

Aoki et al.

[11] Patent Number: 5,018,363
[45] Date of Patent: May 28, 1991

[54] APPARATUS FOR PREPARING ICE CREAMS

[75] Inventors: Ken Aoki, Ashikaga; Katsuhiko Hoshi, Ohta; Shigeo Satoh; Mitsuru Kakinuma, both of Gumma; Shigeru Togashi, Ashikaga; Hiromi Saitoh, Gumma, all of Japan

[73] Assignee: Sanyo Electric Co., Ltd., Oska, Japan

[21] Appl. No.: 367,987

[22] Filed: Jun. 19, 1989

Related U.S. Application Data

[62] Division of Ser. No. 229,601, Aug. 8, 1988, Pat. No. 4,860,550.

[51] Int. Cl.$^5$ .............................................. B67D 5/62
[52] U.S. Cl. ...................................... 62/135; 62/390; 366/177
[58] Field of Search ................. 62/390, 342, 392, 135, 62/343, 69-71; 222/129.4; 366/177, 180, 134

[56] References Cited

U.S. PATENT DOCUMENTS

| 1,794,387 | 3/1931 | Modonnier | 62/342 X |
| 3,627,709 | 12/1971 | Yuza | 62/343 |
| 4,580,905 | 4/1986 | Schwitters et al. | 62/342 X |

Primary Examiner—William E. Wayner
Attorney, Agent, or Firm—Darby & Darby

[57] ABSTRACT

An apparatus for preparing ice creams, wherein a freezing cylinder is constituted such that a liquid mix supplied from a mix tank is stirred in a stirring apparatus that is installed in the inside of the freezing cylinder, and refrigerated so as to complete ice creams, any amount of which can be dispensed through a dispensing port. For the cleaning and sterilization of the inside of the cylinder, the inside is heated by reversing the flow of heat media which are to be circulated through the refrigerating part of the cylinder to dissolve and automatically withdraw the ice creams in the cylinder, then cleaned several times by supplying and discharging hot water, to and from the inside, and after that sterilized by supplying hot water to the inside, and discharging the water from it.

8 Claims, 7 Drawing Sheets

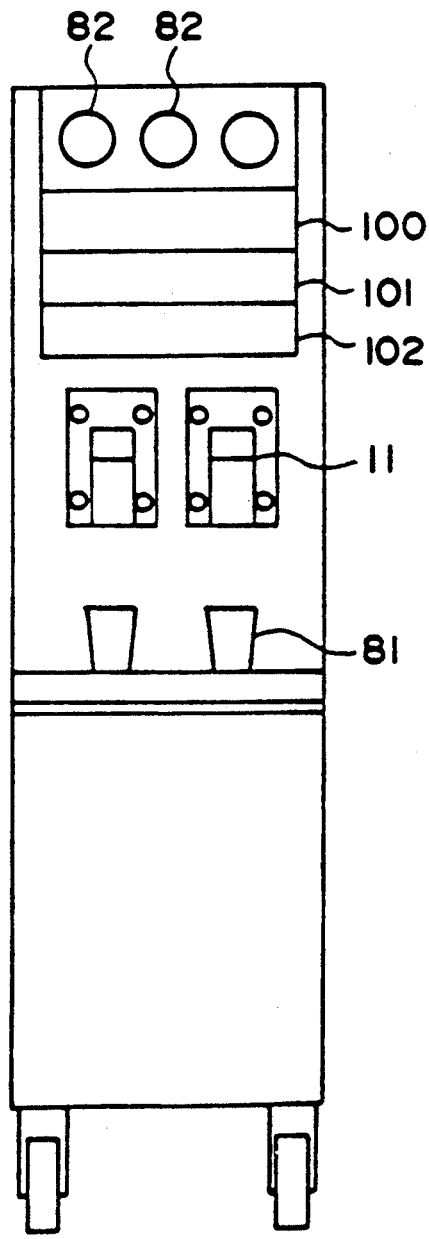
FIG. I A

APPARATUS FOR PREPARING ICE CREAMS

This invention is a divisional application of U.S. Pat. No. 4,860,550 filed 8/8/88.

This invention relates to an apparatus for manufacturing ice creams, such as a soft ice cream or an ice-cream shake.

BACKGROUND OF THE INVENTION

In a conventional apparatus for preparing ice creams, e.g. as described in U.S. Pat. No. 4,703,628, both the freezing cylinder and ice creams are sterilized while a high-temperature refrigerant gas is circulating through the freezing cylinder, and the ice creams are being kept in the inside of the cylinder. In this case, there is a problem in that when a high thermal death point is preset to obtain an excellent sterilization effect, such kind of ices as an ice cream will generate a smell of something burnt, and the flavor of the ice creams reproduced from such ices will be greatly injured.

For the avoidance of such problems, a system is also known as shown in Japanese Patent Early Publication No. 54-37223 for example. In this system, the freezing cylinder is sterilized by boiling water after collecting ice creams in the cylinder. However, in the system described in the above publication, city water is heated in the tank in which the temperature and the quantity of the contents of it are controlled, a prescribed quantity of the boiling water is supplied to the material tank and the freezing cylinder when cleaning and sterilization are needed, and the used boiling water is discharged by opening the gate plunger of the product dispenser after a prescribed period of time controlled automatically. Hence this conventional system has drawbacks in that since the boiling water heated in advance in the tank is fed to the material tank and the freezing cylinder, a large quantity of heat is lost through conduction and radiation to the air in the cylinder, tank, and piping, the temperature of the fed boiling water falls below thermal death points, and satisfactory sterilization can hardly be expected.

Further, in this kind of ice cream manufacturing apparatus, as seen in U.S. Pat. No. 4,703,628, there was only one freezing cylinder to stir and refrigerate ice-cream materials. A plural kinds of flavor piping are connected to such one cylinder such that one of flavors was selected and mixed with the ice creams obtained from the freezing cylinder, and the finished ice creams were poured into a container.

However, such a one-cylinder apparatus caused problems in that since there was only one cylinder, the dispensing of ice creams could not overtake a great demand in summer, and when there was a mechanical trouble no sales were possible.

Accordingly, a two-cylinder apparatus is considered favorable. However, it also caused problems in that a small demand in winter made the products remain unsold, and they had to be wastefully thrown away every day.

By the way, this kind of ices has a luscious taste peculiar to milk fats, and this lusciousness can be softened to some extent by enlarging ice crystals contained in ices.

So, as shown in Japanese Patent Early Publication No. 61-47,149, a liquid mix, a material for ices, has hitherto been entered the freezing cylinder, and once heated prior to refrigerating operations which have been carried out after pull-down operations. Large ice crystals have been formed such that the liquid mix which was hardened through the pull-down operation was thawed to be separated into fat and water through such a heating operation, and then the liquid mix in this separated state was refrigerated through usual refrigerating operations.

However, above-mentioned conventional technology had problems in that since a refrigerated liquid mix must once be heated so as to form large-particle ice crystals, it takes a lot of time to enter into such usual refrigerating operations.

BRIEF SUMMARY OF THE INVENTION

An object of this invention is to provide an ice-cream manufacturing apparatus capable of flexibly cope with the quantity to be sold, and maintaining normal sales such that when one part of the apparatus has a mechanical accident, another part will serve to compensate for the accident.

For the achievement of this purpose, this invention comprising a mix tank for storing a liquid mix, a freezing cylinder having an inlet port to receive the liquid mix into the inside of it, an agitating means to agitate the liquid mix received into the inside, and a dispensing port to dispense the ice cream prepared in the inside, a liquid mix supply means for supplying the liquid mix from the mix tank to the inlet of the freezing cylinder, a refrigerating means for refrigerating the freezing cylinder, a temperature control means for controlling the refrigerating means so as to keep the temperature of the ice cream in the freezing cylinder within a prescribed temperature range, a plurality of flavor tanks for storing each of a plurality of liquid flavors, and a plurality of flavor piping for supplying each of liquid flavors from these tanks to the dispensing port in the freezing cylinder, is characterized by a plurality of the freezing cylinders, connecting means capable of freely connecting said plurality of flavor piping with the dispensing ports of the plurality of the freezing cylinders, and controlling means for selecting freely and operating said freezing cylinders and the flavor piping to be connected thereto.

According to this structure, since the number of the freezing cylinders to be used can be selected freely correspondingly to the amount of sales, and at this time, all the flavor piping can be connected to a selected freezing cylinder, such inconvenience as limits the kinds of flavors to be added will be eliminated. In addition, when one of the freezing-cylinder systems gets out of order in terms of mechanisms or control functions, such system can be replaced by another normal one so that it can be realized to continue operating the apparatus without a halt of sales.

In this case, a desirable standard model of such apparatus may comprise two freezing cylinders and four lines of the flavor piping.

BRIEF DESCRIPTION OF THE DRAWINGS

FIGS. 1A and 1B illustrates an embodiment of an ice-cream shake preparing apparatus of this invention; FIG. 1A is a schematic front view showing the main machinery arrangement, and FIG. 1B is its side view.

FIG. 23 is a time chart for mix-refrigerating operations.

FIG. 24 is a time chart for flavor-measuring operations.

FIGS. 25 (A and B) and 26 (A-D) are flowcharts showing an automatic-washing and a hot-water-sterilizing operation, respectively.

FIGS. 27 and 28 are time charts for the automatic-washing and hot-water-sterilizing operations.

DETAILED DESCRIPTION OF THE PREFERRED EMBODIMENT

Figure 1B:
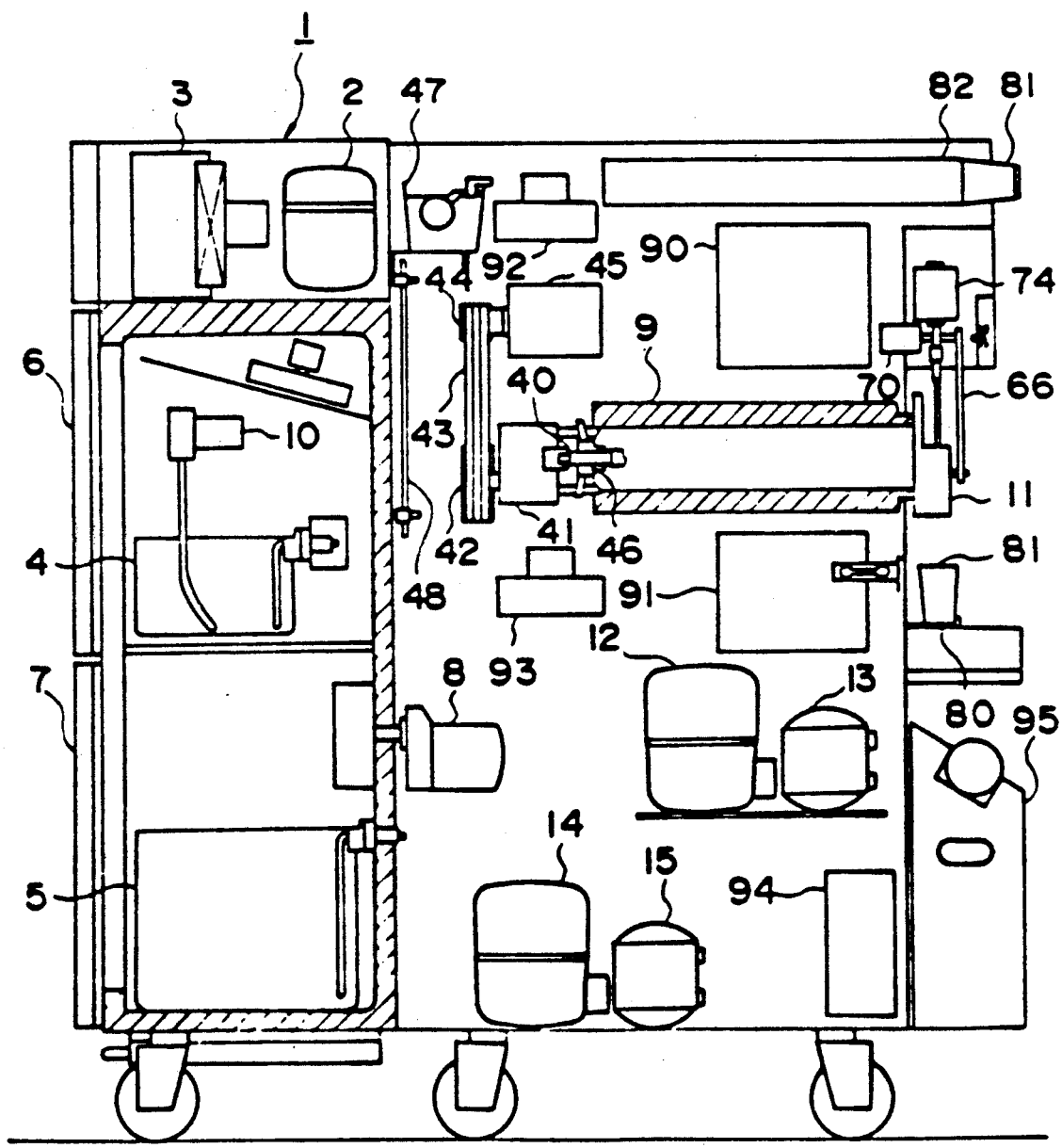

The exemplary embodiments of this invention will be described in the following with reference to the accompanying drawings:

FIG. 1A is a schematic front view of the main machinery arrangement of an ice-cream shake preparing apparatus according to one embodiment of this invention. FIG. 1B is a side view of the ice-cream shake preparing apparatus, in which the refrigerator 1 is located in the rear of the apparatus. The compressor 2 and condenser 3 are located in the upper part of the refrigerator such that the cold air that is generated by compressing and expanding refrigerants is sent into the inside of the refrigerator. The inside is separated into two upper and lower stages. The four different flavor (syrup) tanks, received into the upper stage, and the mix tank 5 that contains main materials for an ice-cream shake, received into the lower stage, can be taken out freely by opening and shutting the doors 6 and 7, respectively.

Figure 2:
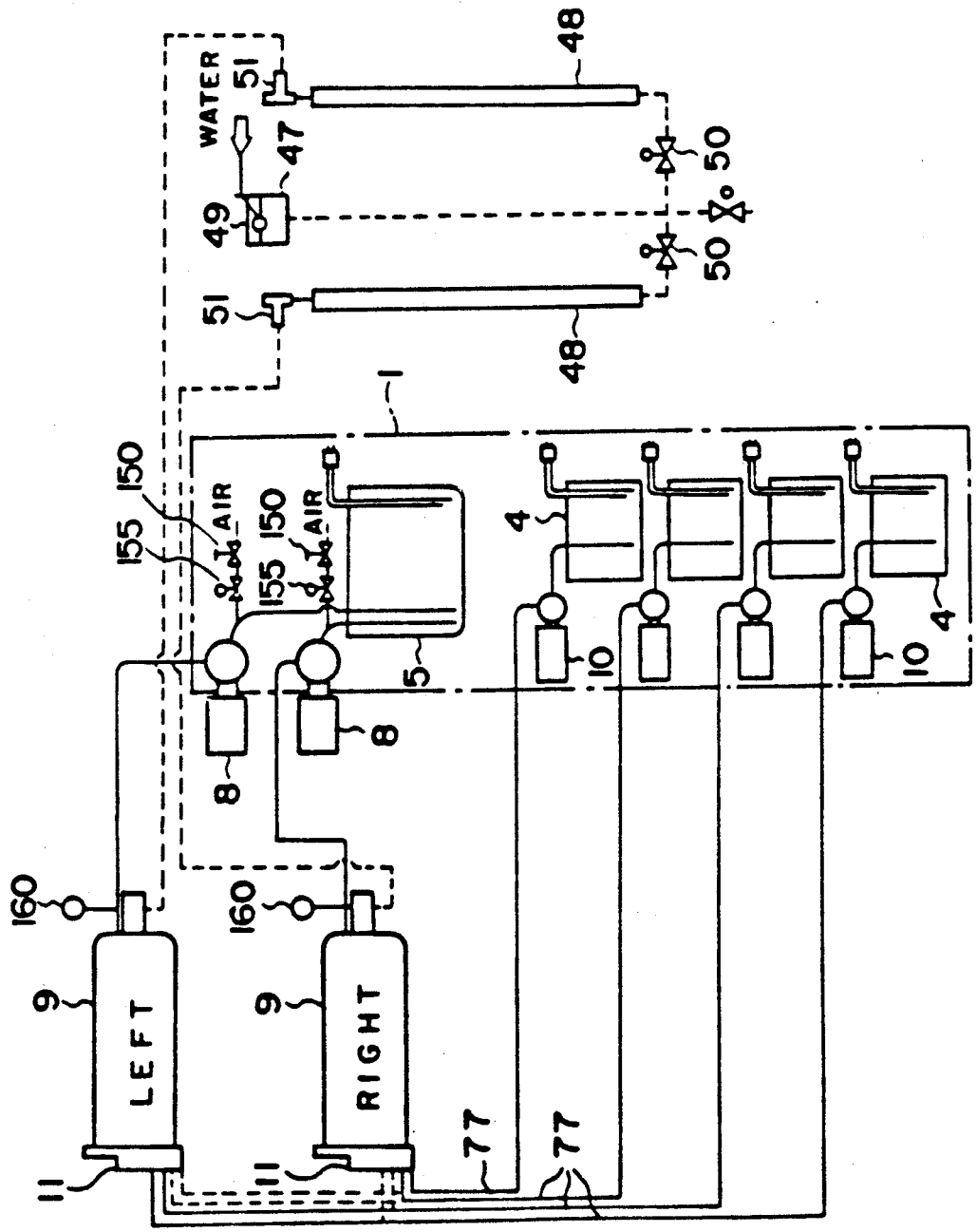
FIG. 2 is a schematic showing a piping arrangement for supplying liquid mixes, flavors, and hot water to a freezing cylinder.

As can be seen from FIG. 2, a liquid mix in the mix tank 5 is fed via the mix pump 8 into the inside of the freezing cylinder 9 located in the front part of the apparatus from its rear part so that the liquid mix is turned into an ice cream after being refrigerated and agitated. The liquid flavors in the flavor (syrup) tanks 4 are fed via the flavor pumps 10 into the freezer door 11 located in the front part of the freezing cylinder. In the freezer door, the liquid flavors are added to the refrigerated-and-agitated ice creams, and the flavor-added ice creams are shaked and poured into a paper cup.

Referring to FIG. 1B, a beater (not shown) for refrigerating and agitating a liquid mix put into the cylinder, and mixing air with it is enclosed in the inside of the freezing cylinder 9. The rotating shaft 40 of beater motor 45 via the gear box 41, pulley 42, endless belt 43, and pulley 44.

The cistern 47 for storing water, and the electric water heater 48 for heating the water fed from it are installed to heat the shaft-sealing part 46 of the rotating shaft 40 at the time of hot sterilizing operations. That is, as shown in FIG. 2, water is stored in the cistern 47, the water level of which is controlled by the ball tap 49, and fed via the supply-electromagnetic valve 50 to the electric water heater 48 to be heated there. The heated hot water is fed via the water-quantity regulator 51 to the shaft-sealing part 46 of the rotating shaft 40 which rotates the beater.

The shaft-sealing part 46 is composed such that the bearing sleeve 46D is fitted, via the O-ring 46C and from the inside of the freezing cylinder 9, in the cylindrical projection 46B of the housing 46A that is inserted into the rear-surface opening of the cylinder 9 and welded there, and three pieces of shaft-sealing O-rings 46E, 46F, and 46G are fitted in the rotating shaft 60A of the beater 60 that passes through the housing 46A and the sleeve 46D, wherein the housing 46A and sleeve 46D function as a bearing. Further, a cavity 46H is formed around the rotating shaft 60A between the sleeve 46D and the O-ring 46G by the housing 46A, the inlet pass 46I that leads the heated hot water to the cavity 46H is formed in the upper part of the housing 46A, and the outlet pass 46J that discharges the hot water is formed in the lower part of it.

Accordingly, at the time of hot-sterilizing operations, hot water is continuously fed to the cavity 46H from the electric water heater 48 via the inlet pass 46I, and touches the rotating shaft 60A. Thus the shaft sealing part 46 is sufficiently sterilized. The hot water is discharged through the outlet pass 46J after touching the shaft.

Figure 4:
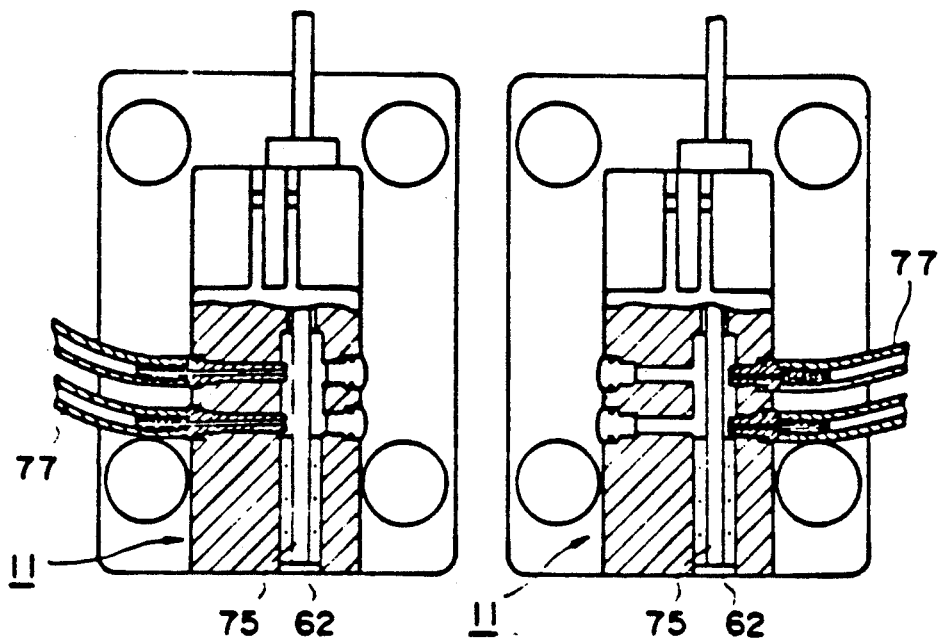
FIGS. 4 and 5 are illustrative cross sections showing the state of the connection between ice-cream dispensing ports and flavor tubes.

The freezer door 11 that is installed in the front part of the freezing cylinder 9 as detailed in FIG. 4 is prepared such that the mix path 62 for pouring out the ice cream pressed out by the rotation of the beater 60 that is enclosed in the inside of the freezing cylinder 9 is formed in the block 61 that shuts up the inside of the cylinder. The beater 60 that has a blade abutting against the inside wall of the freezing cylinder 9 scrapes off the ice creams stuck to the inside wall of the cylinder through the rotation of the blade. Thus the inside of the freezing cylinder 9 is efficiently refrigerated. The mix pass 62 is perpendicular to the horizontal path communicating with the inside of the freezing cylinder 9, in which horizontal path, the door valve 64 for blocking the path through the pushing force exerted by the spring 63 is installed. The pointed end of the valve 64 is coupled with the front end of the push pin 65, and the rear end of the pin is coupled with the idle pit formed in one end of the lever 66 via the pin 68. The lever is rotatably pivoted on the pin 69 that is planted on the shut-up block 61, and the other end is coupled with the right end of the rod 71 that is the movable iron core of the solenoid 70. When the solenoid 70 is in an off state, the rod is pulled into it so that the length of its projected-end part is minimum. Hence, in this state, the door valve 64 is pressed out by the spring 63 so as to close the mix path 62. When the solenoid 70 is in an "on" state, the rod 71 is thrusted out against the force of the spring 72 such that the lever pivots on the pin 69 until the other end of it abuts on the end of the opening-degree-adjusting nut 73. This pivotal movement cause the push pin 65 to push down the door valve 64 against the force of the spring 63 so as to open the mix path 62.

The spinner shaft 75 that is mounted on the rotating shaft of the spinner motor 74 is inserted into the perpendicular mix path 62 via the spinner bearing 76.

As already mentioned above, since two freezing cylinders 9 are installed, also there are two freezer doors 11, wherein four kinds of liquid flavors as shown in FIG. 4 are fed, two kinds at a time, to the perpendicular mix path 62, from the flavor (syrup) tank 4 via the flavor tubes 77. There is no doubt that since four flavor tubes 77 can be mounted on the perpendicular mix path 62, the four flavor tubes as shown in FIG. 4 can be connected with one freezer door 11 when one of the freezing cylinder 9 is stopped.

Figure 3:
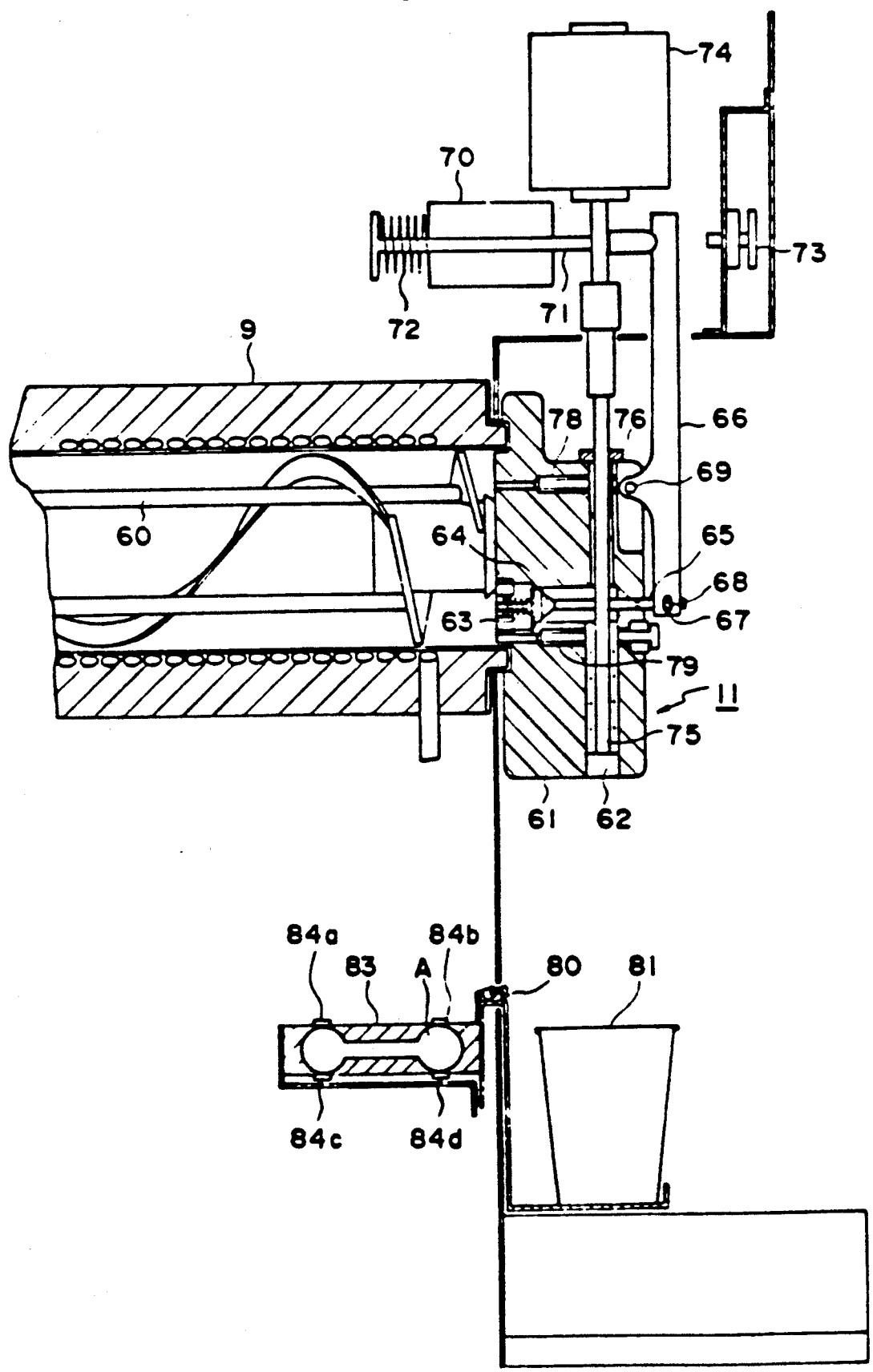
FIG. 3 is a sectional view showing the structure of an ice-cream dispensing port and a weighing part.

As shown in FIGS. 1 and 3, the cup table 80 is installed below the freezer door 11. A paper cup is placed on the table so that it receives an ice-cream shake comprising an ice cream poured out from the mix path 62 and a flavor added thereto. Many of this paper cup 81 that can be taken out freely are accommodated in the cup dispenser 82 installed in the upper front part of the apparatus.

Figure 6:
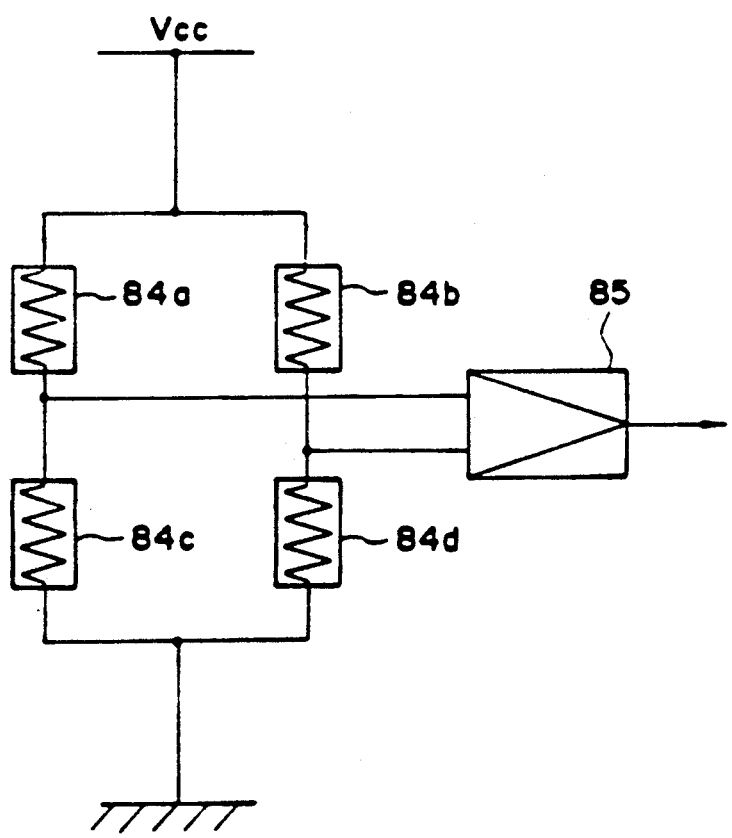
FIG. 6. is a circuit schematic for a detector to pick up weight signals.
Figure 7:
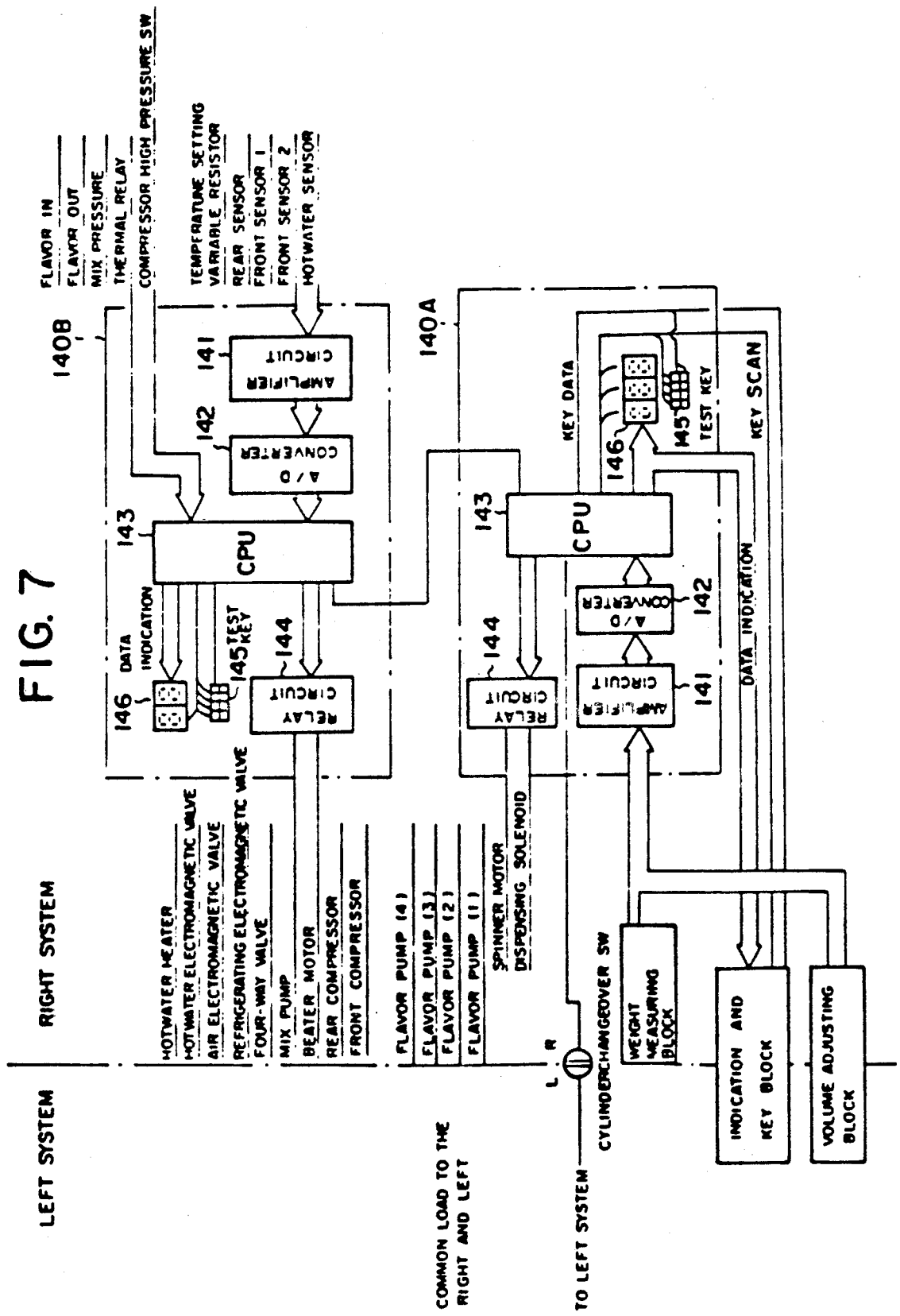
FIG. 7 is a circuit schematic corresponding to the right system part of the control part of the ice-cream-shake preparing apparatus shown in FIG. 1.

The cup table 80 is detachably mounted on one end of the weight-detector 83. The detector as shown in FIG. 3 is made such that an area designated as A is stamped out from a block, such as one made of an aluminum alloy, to form four thin-thickness parts, the distortion sensors $84a$–$84d$ are affixed to the thin parts, and the other end of the block is fixed to the apparatus. Each of the sensors is connected in bridge as shown in FIG. 6, the output of which is taken out as a weight-detecting signal via the differential amplifier 85.

Referring again to FIG. 1B, the operating panels 100, 101, and 102 are installed below the cup dispenser 82 in the front part of the apparatus, which accommodates paper cups 81.

FIG. 11 shows only a right, and a left is omitted. Such unit control means further comprises the two control blocks 140A (also named as base panel A) and 140B (also named as base panel B). Each of these control blocks 140A and 140B comprises the amplifier circuit 141, the A-D converter 142 for converting the analog output signals of the amplifier circuit 141 into digital signals, the CPU (central processing unit) 143 for outputting commands to drive or stop machinery, indicating signals, and the like by performing processes corresponding to the converted digital signals, the relay circuit 144 for actually controlling the pumps or the like correspondingly to such commands to drive or stop machinery, the various kinds of test keys 145, and the indicators 146.

For example, when you want to operate both the right and left cylinders, each of the right and left freezer doors 11 is connected with the two flavor tubes 77.

Figure 5:
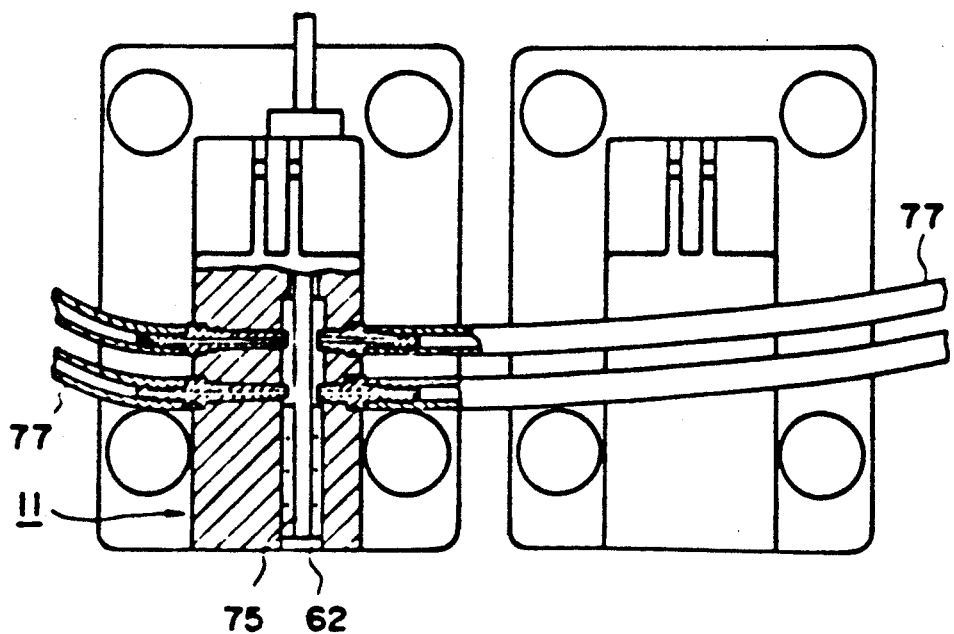

When you want to operate only the left freezing cylinder 9, four flavor tubes 77 are connected to the left freezer door 11 as shown in FIG. 5.

The operations of the apparatus to sell ice-cream shakes during business hours are then executed by placing a paper cup 81 on the cup table 80, and pushing the automatic switch 112 or manual switch 113 on the operating panel 100. That is, when the automatic switch 112 is pushed, the solenoid 70, spinner motor 74, flavor pump 10, and beater motor 45 are simultaneously activated. A liquid mix is put into the freezer door 11 by opening the valve 64 in it via the lever 66 activated by the solenoid 70, and at the same time the flavor which is supplied through the flavor pump 10 is mixed with the liquid mix there by rotating the spinner motor 74. The mixed liquid mix falls over into the cup 81, the weight of which is detected through the weight detector 83 to send out a signal when a given amount of weight is reached, and the signal stops operating the solenoid 70, spinner motor 74, flavor pump 10, and beater motor 45. In order to discharge the flavor-mixed liquid mix remaining then in the path of the freezer door 11, the operation of the solenoid is stopped a little later after the flavor pump 10 is stopped. The purpose of this is to prevent the previous flavor from being mixed with the next flavor different from the previous one.

In this operation to automatically dispense ice-cream shakes, the weight of the liquid mix in the paper cup 81 will vary when there is a difference in weight among the paper cups 81 or there is something, such as a liquid mix stuck on the cup table 80. In order to avoid this and always dispense a given amount of ice-cream shakes, the control block 140A of this embodiment as shown in FIG. 11 operates such that when a paper cup 81 is placed on the cup table 80 and the automatic switch 112 is pushed, the control block 140A begins controlling dispensing operations by assuming the sum of the weight of both the cup table 80 and the paper cup 81 to be zero. weight of a liquid mix (hereinafter designated as dot adjusting weight), which is to be dispensed to remove the previous flavor remaining in the mix path 62 just after the flavor pump 10 is stopped, from the total weight $W_2$, as the flavor-stop weight $W_1$. Then the control block 140A activates the flavor pump 10, beater 60, solenoid 70, and spinner motor 74 and the like to start control operations to dispense ice-cream shakes. The control block 140A watches the weight of ice-cream shakes to be dispensed on the basis of signals obtained from the operational amplifier 85 of the weight detector 83, and stops supplying flavors to the mix path 62 by stopping the flavor pump 10 when the flavor-stop weight $W_1$ has been reached. Then it stops the solenoid 70 and spinner motor 74 to cease dispensing ice-cream shakes when the total weight $W_2$ has been reached. It is secured to always dispense a prescribed amount of ice-cream shakes to the paper cup 81.

It must be avoided, however, to dispense ice-cream shakes when the automatic switch 112 is pushed, while no paper cup 81 is placed on the cup table 80. Hence it is needed to judge whether there is the paper cup 81 on the cup table 80. In this embodiment, the judgement is formed based upon the signals from the same weight detector 83 as that used for measuring the weight of dispensed ice-cream shakes. Before the automatic switch 112 is pressed, the control block 140A stores the weight of the table 80 as zero when there is no paper cup 81 thereon by pressing the calibrating switch 127 and cancelling switch 111 on the operating panel 100. As the weight of the paper cup is about 10 g, the weight of the cup table 80 with no paper cup 81 thereon is defined as 6 g or less to make dispensing operations impossible when it is 6 g or less. Also it is made impossible to dispense shakes when the weight of the cup is 180 g or more (a state in which the cup is already filled with liquid mixes). The control block 140A stores in advance these values, 6 and 180 g, as the limits of such weight. When the automatic switch 112 is pushed, the block judges whether the weight detected through the weight detector 83 is between 6 and 180 g, and if this is the case it begins controlling the dispensing operations mentioned above after resetting the detected weight as zero by assuming the paper cup 81 has been placed on the cup table 80. If that is not the case, it prevents the dispensing operations from starting by assuming the paper cup 81 has not been set to the table.

In this embodiment, the sole weight detector 83 thus detects both the weight of ice-cream shakes to be dispensed and of the paper cup 81 without the use of separate sensors. operations.

FIG. 20 shows a flowchart for refrigerating, flavor-adjusting, and dispensing processes. FIG. 21 shows a flowchart for an automatic dispensing process. These processes are executed by the control block 140A shown in FIG. 11. FIG. 22 shows a routine for refrigerating and dispensing processes, which are executed by the control block 140B of FIG. 22. FIG. 23 shows the timing in such refrigerating operations, and FIG. 24 shows the timing in such flavor adjusting operations.

The control block 140A determines whether each of operations in steps 501-504 is under execution. When the refrigerating switch 126 has been pushed, steps 505 and 506 are executed, and if step 506 is not the case, the control block proceeds to steps 507-510. When step 507 is completed by the block 140A, the control block 140B proceeds to steps 573 and 574. In step 510, the control block 140A executes either of steps 511 or 512 correspondingly to the judgement formed in steps 589 and 591 or in steps 603 and 609, and proceeds to step 516. If step 513 is not the case, the control block proceeds to step 516. In step 516, if the calibrating switch 127 is turned on, it proceeds to step 517, and if the switch 127 has not been pushed twice, it proceeds to step 518. When step 517 is the case, step 520 is executed, and if step 516 is not the case, step 519 is executed. In step 519, when the calibration lamp is on, it is considered to be under execution. In step 521, if the cancel switch has been pushed, step 522 is executed. In step 522, when the calibration lamp is on, step 523 is executed. In step 523, the basic weight of the weighing machine (the weight in a state in which the cup table 80 is set to the machine) is stored. In steps 525 and 526, it is determined whether the changeover switch (R-Dual-L) is set at Dual and, the right system is under operation by reviewing the switch. If this is not the case, step 527 is executed, and if otherwise step 567 is executed. In steps 527 and 528, it is determined whether other flavor lines 2-4 are under dispensation. If this is the case, step 562 is executed, and if otherwise steps 529-531 are executed. In steps 531 and 532 or steps 531 and 534, flavor-calibrating operations are carried out. If step 530 is not under calibration, steps 535-539 are executed. If these steps are not the case, step 540 is executed, and if they are the case, step 562 is executed. In step 540, when $W_1$ and $W_2$ have not been calculated, steps 541-543 are executed. Step 543 determines whether there is a cup. If there is no cup, step 549 is executed, and the error is informed. If there is a cup, step 544 is executed, and it is judged whether the weight is over. Also step 549 is executed here when the weight is over. If step 544 is the case, steps 545-548 are executed. Steps 550-556 are executed when $W_1$ and $W_2$ have been calculated in step 540. When the cancelling switch 111 is pushed in step 550, steps 560 and 561 are executed, and dispensation is stopped. In step 553, if the cup is removed during dispensation, steps 549, 560, and 561 are executed, and dispensation is stopped. In step 555, when measured weight exceeds $W_1$, steps 557-559 are executed. In step 558, when measured weight overs $W_2$, steps 560 and 561 are executed, and dispensation is stopped. Steps 562 and 563 are similar to steps 527 and 528. Step 564 is similar to steps 529-561, a first-flavor-automatic-dispensing routine. In steps 565 and 566, if the cylinder is single, the control block proceeds to step 567. Steps 567 and 568 are similar to steps 527 and 528. Steps 569 is similar to above-mentioned steps 529-561, a first-flavor-automatic-dispensing routine.

While the control block 140A executes above-mentioned step 527, the control block 140B executes steps 573 and 574. When the refrigerating switch 126 is pushed then, the control block proceeds to steps 574, 575, 576, 588, 590, and 605 since the temperature of liquid mixes is naturally high. When the pressure in the cylinder is "H", steps 610 and 611 are executed, and when it is "L", steps 606 and 607 are executed. The expression "AIR Mg VALVE" means a valve that is opened and closed to appropriately mix air with a liquid mix.

In step 576, when the temperature of the liquid mix goes down to a first preset temperature ($-1.7°$ C.) to form ice crystals, the control block 140B executes steps 577 and 578, and proceed to steps 578-589 then. In step 578, when the temperature of the liquid mix drops to a preset temperature, step 579 is executed to complete a pull-down operation, and step 574 proceeds solely to step 580 thereafter. Upon completion of the pull-down operation steps 599 and 612 are executed since "three-minute WAIT" is not cleared, and steps 599 and 600 are executed after the lapse of three minutes. In step 600, steps 600 and 608 are executed until thirty seconds have elapsed, and steps 600-602 are executed after the lapse of thirty seconds. Step 602 proceeds to steps 603 and 604 or step 609 depending on the result of step 601. In step 580, steps 582-584 are executed when step 548 is executed by the control block 140A. In step 584, step 585 or 591 are executed according to the state of the front and rear compressor. When step 586 is not cleared after steps 580-581 are executed, steps 580 and 581 are executed if step 560 is completed, however, execution of steps 582-586 are guaranteed unless step 587 is executed. Just after step 587, steps 599 and 612 are executed since "three-minute WAIT" is not cleared, and steps 599 and 600 are executed after three minutes. Just after this, steps 600 and 608 are executed since thirty seconds have not elapsed yet, and steps 600-602 are executed after thirty seconds. Step 602 executes steps 603 and 604 or step 609 according to the result of step 601.

The above deals with an ice-cream-shake preparing apparatus operated during business hours, however, it is required to collect a liquid mix in the freezing cylinder 9, and to sterilize and wash the flavor and mix lines after the shop is closed. This automatic washing and sterilizing system using hot water will be described below.

First, push the sterilizing switch on the operating panel 101 to dissolve and discharge the liquid mix in the freezing cylinder 9. Upon pushing this switch, the beater motor 45, four-way valve 21, rear compressor 14 are activated to dissolve the liquid mix in the freezing cylinder 9 by heating it through the heat-pump functions of heating media which are circulated via the refrigerant piping 25 as shown by arrows with broken lines in FIG. 3. When the front sensor 30 judges that the liquid mix has been dissolved at 5° C., the rear compressor 14 and four-way valve 21 are stopped, and at the same time, the timer-2 is set going so that the mix pump 8, air-electromagnetic valve 155, and solenoid 70 are operated for a given time to discharge the dissolved liquid mix in the freezing cylinder 9.

Next, when the second sterilizing switch 129 is pushed, the mix pump 8 and air-electromagnetic valve 155 are activated to feed a rinse which is prepared in the mix tank into the freezing cylinder 9. When the pressure switch 160 is turned off, the mix pump 8 and air-electromagnetic valve 155 are stopped, and at the same time, the timer-2 is set going so that the beater motor 45 and solenoid 70 are operated for a given time to discharge the rinse in the freezing cylinder 9. The above-mentioned operations are repeated three times. In the fourth operation, a rinse fed into the freezing cylinder 9 is heated through a heat pump operation by operating the rear compressor 14 and four-way valve 21. The rinse is kept at a prescribed temperature for a given time by means of the sterilization-watching timer thereafter, and then is discharged to complete the operation.

FIGS. 25 A and B, and 26 A-D show the above-stated processes of automatic washing and hot-water sterilizing operations. Those processes shown in FIG. 25 are executed by the control block 140A, and those shown in FIG. 26 are executed by the control block 140B. FIGS. 27 and 28 show the timing of the main machinery in performing those processes shown in FIGS. 25 and 26.

Referring to FIG. 25, the control block 140A executes steps 701-704, and determines whether the first-sterilizing switch is pushed on condition that flavor-line-washing, mix-line-washing, refrigerating or calibrating, and liquid-mix-feeding operations are not under execution, step 705.

Since the first-sterilizing switch is a toggle switch, when it is pushed first, N in step 706, an "OK signal on a first sterilizing operation" is sent to the control block 140B, step 707.

Then, the first-sterilization lamp is lit, and all the LEDs corresponding to second-sterilizing, flavor-washing, mix-line-washing, refrigerating or calibrating, and liquid-mix feeding operations, which are going on-and-off, if any, are turned off, steps 708 and 709. A "wait-for-two-minutes" signal is received, step 710, and it is judged whether there is the signal, step 711.

As the "wait-for-two-minutes" signal has not been sent at this time from the control block 140B, step 712 is executed. Since the dispensing solenoid 70 is also in the off position, N in step 712, and further the second sterilizing switch 2 is also in the off position, N in step 713, the control block proceed to step 714, and END.

The control block 140B, which receives an "OK signal on first sterilization" from the control block 140A, detects the existence of the "OK signal on first sterilization", Y in step 715, and set a flag to indicate the first sterilization is under process, step 716. When the first sterilization is under process, N in step 717, the beater motor 45 is turned on, step 718. When the inside temperature of the freezing cylinder is low at this time, N in step 719, the rear compressor 14 and four-way valve 21 are turned on, steps 720 and 721, to heat the freezing cylinder 9 through a heat pump operation. The inside temperature of the freezing cylinder 9 is measured, step 722, and it is determined whether the temperature is high, step 723. When the temperature is not high, N in step 723, the control block proceeds to steps 724 and 725, and END.

The control block 140B repeats the above processes, and reenters into this routine from START so that the liquid mix in the freezing cylinder 9 is thawed by executing the heating processes of the freezing cylinder 9. As a result, when the inside temperature rises to about 5° C., Y in step 723, a flag is set to indicate the temperature has risen, step 726, so that the control block proceeds to steps 724 and 725, and END.

When it reenters into this routine from START, Y in step 719, the rear compressor 14 and four-way valve 21 are turned off, steps 727 and 728, to complete the heating of the freezing cylinder 9. Since the time elapsed is under two minutes at this time, N in step 729, "under-two-minute WAIT information" is outputted to the control block 140A, and at the same time, the timer is set going to measure the elapsed time, step 731. When the pressure in the freezing cylinder 9 is "H" at this time, Y in step 732, the control block proceeds to steps 733 and 734, and END, while leaving the mix pump 8 and air electromagnetic valve 155 as they are.

Upon receiving the "two-minute-WAIT information", Y in step 711, the control block 140A keeps this state for fifteen seconds, and after fifteen seconds, Y in step 735, the solenoid 70 is turned on to discharge the liquid mix in the freezing cylinder 9, step 736.

The control block 140B repeats the execution of steps 715-719 and 727-734, and keeps watching the time of two minutes to be elapsed through the timer, while keeping discharging liquid mixes such that when the pressure in the freezing cylinder 9 falls with the discharge of liquid mixes, step 732, the mix pump 8 and air-electromagnetic valve 155 are turned on, steps 737 and 738, to feed air into the freezing cylinder 9 so as to facilitate the discharge of the liquid mixes. After two minutes have elapsed, Y in step 729, such operations as to set a flag for the completion of first sterilization or the like, step 739, are executed, and it is confirmed again that the rear compressor 14 and four-way valve 21 are off, steps 740 and 741, so that "under-two-minute WAIT information" which has been outputted to board A is stopped, step 742.

With the disappearance of this information the control block 140A proceeds to step 743 via steps 711 and 712, there turns the first sterilization lamp on and off to inform the completion of a first sterilizing operation, and stop sending the "OK signal on first sterilization" to the control block 140B, step 744. Also the solenoid 70 is turned off, step 745.

An operator finds the end of the operation through the on-and-off first sterilization lamp, and push the first sterilizing switch 128 to confirm it or the operator may push the switch 128 during the first sterilization so that the control block 140A executes step 706 to turn the first sterilization lamp off, step 746.

After the completion of the first sterilization, in which the liquid mixes in the freezing cylinder 9 have been dissolved and discharged, an operator push the second sterilizing switch 129 to wash the inside of the cylinder 9 after feeding a rinse into the mix tank 5.

The control block 140A proceeds to step 749 via steps 705, 747, 713, and 748 to send an "OK signal on second sterilization" to the control block 140B. Since no "abnormal sterilization information" has been inputted then from the control block 140B, step 750, the control block 140A proceeds to step 753 via step 751 to turn the second sterilization lamp 2 on, informing the start of second sterilization, step 752. Since no "under two-minute WAIT information" has been inputted at this time from the control block 140B, steps 754 and 755, the dispensing solenoid 70 is off, step 756, and the counter which counts the number of on-and-off operations of the solenoid still reads zero, it proceeds to END via step 757.

Upon receiving the "OK signal on second sterilization" from the block 140A, the control block 140B proceeds to step 759 via steps 715, 758-1, and 758-2 to set an under-second-sterilization flag. Since there is nothing in the freezing cylinder 9 and the inside pressure is low, the control block 140B proceeds through steps 760 and 761 to turn the mix pump 8 on, step 762, turn the air-electromagnetic valve 155 off, step 763, and turn the beater motor 45 on, step 764. After this, it turns the hot-water-electromagnetic valve 50 off, step 765, the hot-water heater 48 off, step 766, the rear compressor 14 off, step 767, and the four-way valve 21 off, step 768, and then proceeds to END.

Through these series of processes the rinse is fed into the freezing cylinder 9 from the mix tank 5, and when the inside pressure rises to "H", the control block 140B proceeds through steps 761 and 769 to add one count to the wash counter, step 770. Then, the mix pump 8 and air-electromagnetic valve 155 are turned off, step 711 and 772, and the supply of the rinse to the freezing cylinder 9 is stopped. The control block 140B thus proceeds through step 773 to turn the beater motor 45 on, step 774, so that "under two-minute WAIT information" is outputted to the control block 140A, step 775.

As a result of this, the control block 140A proceeds through step 755, and when fifteen seconds have elapsed, step 776, turns the dispensing solenoid on, step 777.

When two minutes have elapsed after feeding the freezing cylinder 9 with the rinse, the control block 140B proceeds through step 773 to execute preparatory processes needed for the next washing, step 778, and stop outputting the "under two-minute WAIT information" which has been outputted to the control block 140A, step 779.

With the stoppage of this information the control block 140A proceeds through steps 755 and 765, in which the dispensing solenoid 70 has been on, to turn the solenoid 70 off, step 780. There it adds one count to the counter to count the number of rinses, that is, the number to turn on the solenoid 70, step 781, and proceeds to END via step 757. Thus the first mix-line washing operation ends.

The control block 140A waits for the input of the "under two-minute WAIT information" from the control block 140B, while repeatedly executing a loop of steps 701–705, 747, 713, 714, and 749–757.

The control block 140B feeds again a rinse into the freezing cylinder from the mix tank 5 after executing a loop of steps 715, 758-1, 758-2, 759-768, and starts executing a second mix-line washing operation.

After repeating such mix-line washing operations three times and starting forth operations, the control block 140B proceeds through steps 761 and 769, and turns the beater motor 45 on, step 782, when the inside pressure of the freezing cylinder 9 becomes "H" with the supply of the rinse, step 782.

Since the temperature in the cylinder is still low at this early stage of hot sterilizing operation, the control block 140B proceeds through steps 783–785 and 786 and 787, and measures the inside temperature of the cylinder, step 788. Since the temperature is still low, it proceeds to step 790, where the temperature of the inside of the cylinder 9 is raised to 80° C., via step 789, and controls the on-and-off operations of the rear compressor 14 and four-way valve 21 so that they functions as a heat pump. Upon completion of steps 791 and 792 it proceeds to END.

The control block 140B repeatedly executes a routine of steps 715, 758-1, 758-2, 759-761, 769, and 782-792 so as to raise the temperature of the rinse in the freezing cylinder to 80° C.

So far as the apparatus works normally, the heating of the inside of the cylinder is completed, step 789, and the heating flag in the cylinder is set, step 793. Upon completion of such heating in the cylinder, the control block proceeds to step 794 via step 784, and starts counting time. Also it turns the hot-water-electromagnetic valve 50 on, step 795, and controls the on-and-off operations of the electric water heater 48 so as to attain a prescribed temperature of the hot water to be fed to the shaft sealing part 46, step 796.

The control block 140B accumulates the time when the inside temperature of the cylinder is 78° C. or over by controlling the on-and-off operations of the rear compressor 14 and four-way valve 21 so that they operate as a heat pump, step 797.

If the apparatus is normal, the temperature rises to 75° C. or over, step 799, when the cumulative time amounts to 30 minutes, step 798, so that sterilizing processes are completed, step 800.

When the heating is not completed, however, thirty minutes after starting the on-and-off control of the rear compressor 14 and four-way valve 21, the sterilizing operations are stopped as an abnormal sterilizing process, step 801 after prosecuting steps 784N and 784Y, and "abnormal sterilizing process information" is outputted to the control block 140A, step 802. Even if the inside temperature of the freezing cylinder rises to 80° C. through the heat control, when forty minutes have elapsed before the cumulative time of the temperature of 78° C. or over amounts to thirty minutes, step 794, abnormal sterilizing processes, steps 801 and 802 are also executed. Further, even if the inside temperature of the freezing cylinder has risen to 80° C. through the heat control and the cumulative time of the temperature of 78° C. or over has amounted to thirty minutes before forty minutes have elapsed, when the resulted temperature is 75° C. or under, the abnormal processes, steps 801 and 802 are also executed.

When such abnormal sterilizing processes occur, the control block 140A proceeds through step 751, turns the second sterilization lamp off, step 803, and stops sending the OK signal on second sterilization outputted to the control block 140B, step 804.

When sterilizing processes have been completed normally, the control block 140B proceeds through steps 783 and 805, and turns the mix pump and air-electromagnetic valve on, step 806 and 807, to feed air into the freezing cylinder. Also it outputs the "under-two-minutes WAIT information" to the control block 140A, step 808, turns the hot-water-electromagnetic valve 50, electric water heater 48, rear compressor 14, and four-way valve 21 off, steps 809-812, and proceeds to END.

Upon receiving the "under-two-minute-WAIT information", the control block 140A proceeds through step 755, and turns the solenoid 70 on, step 777, after fifteen seconds have elapsed, step 776.

When two minutes have elapsed then, the control block 140B proceeds through step 805, executes second-sterilization-ending processes, step 814, such as to stop sending "two-minute-WAIT information" to the control block 140, step 813, and to set a second-sterilization-ending flag, and turns the beater motor 45, mix pump, and air-electromagnetic valve off, steps 815-817.

With the ending of the "two-minute-WAIT information" the control block 140A proceeds through steps 755 and 756, turns the solenoid 70 off, step 780, and counts the number of the on-and-off operations, step 781. When the number of the counts amounts to four, it proceeds through step 757, turns the second sterilization lamp off, step 803, and stops sending the "OK signal on second sterilization" to the control block 140B.

As a result of this, the control block 140A circulates thereafter along a routine comprising steps 701-705, 747, 713, and 714, while the control block 140B goes into a standby state after proceeding through a routine consisting of steps 715, 758-1, 758-2, and 818.

We claim:

1. An apparatus for preparing an ice cream product, comprising:

a plurality of respective cylinders;

means for preparing ice cream within said cylinders, said preparing means including means for supplying a mix to an inside of each of said respective cylinders, means for refrigerating and agitating the mix inside said cylinders and for maintaining a temperature inside said cylinders within a predetermined temperature range to produce the ice cream, and means for dispensing the ice cream after preparation is complete;

means for holding a plurality of different flavors; and selection means for selectively supplying any of said flavors from said holding means to each of said cylinders so that the ice cream dispensed is flavored and for selectively operating said preparing means to prepare the ice cream within each of said cylinders, selectively.

2. An apparatus as in claim 1, wherein said holding means includes a plurality of containers which hold said flavors, respectively, said selection means including a plurality of conduits extending and enabling communication between each of said containers and each of said cylinders for enabling flow of the flavors through said conduits.

3. An apparatus as in claim 2, wherein said conduits are in communication with said containers, respectively, so that there is at most one respective conduit extending from said containers, respectively.

4. An apparatus as in claim 1, further comprising:

a control panel from which selective operation of said selection means may be effected.

5. An apparatus as in claim 1, further comprising:

means for detecting a weight of the flavored ice cream being dispensed; and means responsive to said detecting means for stopping the supply of said flavor to said cylinders when the weight reaches a predetermined value.

6. An apparatus as in claim 5, further comprising:

means responsive to said detecting means for stopping a dispensing of the flavored ice cream when the weight reaches a predetermined value.

7. An apparatus as in claim 1, further comprising:

means for detecting a weight at an area to which the flavored ice cream is received; and means responsive to said detecting means for preventing a dispensing of the flavored ice cream when the weight is beneath a predetermined value which is indicative of a n absence of a receptacle at said area for the flavored ice cream and for preventing a dispensing of the flavored ice cream when the weight is above another predetermined value which is indicative of a desired quantity of the flavored ice cream being already present at the area.

8. An apparatus as in claim 1, further comprising:

delay means for preventing a desired flavor being supplied to any of said cylinders from becoming mixed with any flavor still remaining in a path through which the ice cream dispenses.

* * * * *